US012625654B2

(12) United States Patent
Yoshimi

(10) Patent No.: US 12,625,654 B2
(45) Date of Patent: May 12, 2026

(54) IMAGE FORMING APPARATUS, NON-TRANSITORY COMPUTER READABLE MEDIUM, AND IMAGE FORMING METHOD

(71) Applicant: FUJIFILM Business Innovation Corp., Tokyo (JP)

(72) Inventor: Makoto Yoshimi, Kanagawa (JP)

(73) Assignee: FUJIFILM BUSINESS INNOVATION CORPORATION, Tokyo (JP)

( * ) Notice: Subject to any disclaimer, the term of this patent is extended or adjusted under 35 U.S.C. 154(b) by 0 days.

(21) Appl. No.: 17/880,829

(22) Filed: Aug. 4, 2022

(65) Prior Publication Data

US 2023/0305781 A1 Sep. 28, 2023

(30) Foreign Application Priority Data

Mar. 25, 2022 (JP) ................................. 2022-050179

(51) Int. Cl.
*G06F 3/12* (2006.01)

(52) U.S. Cl.
CPC .......... *G06F 3/1273* (2013.01); *G06F 3/1256* (2013.01); *G06F 3/1291* (2013.01)

(58) Field of Classification Search
CPC ..... G06F 3/1273; G06F 3/1256; G06F 3/1291
See application file for complete search history.

(56) References Cited

U.S. PATENT DOCUMENTS

| | | | |
|---|---|---|---|
| 10,171,685 B2 | 1/2019 | Yamada et al. | |
| 2003/0142350 A1* | 7/2003 | Carroll ................. | G06F 3/1205 358/1.15 |

| | | | | |
|---|---|---|---|---|
| 2007/0046974 A1* | 3/2007 | Machida | ............ | H04N 1/32646 358/1.14 |
| 2008/0184205 A1* | 7/2008 | Thomas | .................. | G06F 8/656 717/126 |
| 2009/0237728 A1* | 9/2009 | Yamamoto | ......... | H04N 1/00204 358/1.15 |
| 2010/0007916 A1* | 1/2010 | Ikeda | ..................... | H04N 1/444 358/1.15 |
| 2010/0165376 A1* | 7/2010 | Matsuyama | .......... | G06F 3/1288 358/1.14 |
| 2013/0046843 A1* | 2/2013 | Sagara | ................ | H04L 41/0886 709/208 |

(Continued)

FOREIGN PATENT DOCUMENTS

| | | |
|---|---|---|
| JP | 2006-281593 A | 10/2006 |
| JP | 2007-086970 A | 4/2007 |

(Continued)

OTHER PUBLICATIONS

Feb. 3, 2026 Office Action issued in Japanese Patent Application No. 2022-050179.

*Primary Examiner* — Iriana Cruz

(74) *Attorney, Agent, or Firm* — OLIFF PLC.

(57) ABSTRACT

An image forming apparatus includes a processor configured to: in a case where the image forming apparatus delegates a process to an external apparatus, acquire from the external apparatus to which the process is delegated, first information with regard to progress of the process delegated to the external apparatus; and present the acquired first information in a listing screen for information with regard to executed-process history.

10 Claims, 11 Drawing Sheets

| JOB-CHECK SCREEN | USER A |
|---|---|

00250   TRANSLATION OF SCANNED DOCUMENT         [ CLOSE ]

COUNTERPART: SERVICE FOR TRANSLATION OF
                 SCANNED DOCUMENT

STATUS: TRANSLATING
NUMBER OF SHEETS/TRANSLATION REQUESTED: 26
NUMBER OF SHEETS/TRANSLATION COMPLETE: 10

[ UPDATE STATUS ]      [ ABORT ]

(56)     References Cited

U.S. PATENT DOCUMENTS

2014/0055809  A1*   2/2014   Nishida ................. G06F 3/1238
                                                       358/1.14
2015/0116756  A1*   4/2015   Mori .................. H04N 1/00854
                                                       358/1.14
2017/0171399  A1*   6/2017   Yamada ................ G06F 3/1287

FOREIGN PATENT DOCUMENTS

JP          2017-111799  A       6/2017
JP          2019-028996  A       2/2019

* cited by examiner

FIG. 4

| DOCUMENT NAME | LANGUAGES | DATE AND TIME OF DELEGATION | STATUS |
|---|---|---|---|
| D001 | JAPANESE → CHINESE | 2021/08/05  07:50:12 | TRANSLATION COMPLETE |
| D002 | ENGLISH → JAPANESE | 2021/08/10  12:00:48 | TRANSLATION COMPLETE |
| D003 | THAI → ENGLISH | 2021/08/13  17:33:21 | TRANSLATION COMPLETE |
| D004 | JAPANESE → ENGLISH | 2021/08/18  09:28:56 | TRANSLATING |
| D005 | CHINESE → ENGLISH | 2021/08/23  14:42:32 | TRANSLATING |
| D006 | JAPANESE → ENGLISH | 2021/08/26  18:31:07 | WAITING FOR TRANSLATION |
| ⋯ | ⋯ | ⋯ | ⋯ |

| JOB ID | 00250 | F1 |
|---|---|---|
| JOB TYPE | TRANSLATION OF SCANNED DOCUMENT | |
| NUMBER OF SHEETS | 26 | |
| USER ID | A | |
| PASSWORD | ABCD1234 | |
| DATE AND TIME OF DELEGATION | – | |
| ESTIMATED TIME OF COMPLETION OF TRANSLATION | – | |
| JOB STATUS | SCANNING | |

| JOB STATUS | SCAN COMPLETE | F2 |
|---|---|---|

| JOB STATUS | TRANSMITTING | F3 |
|---|---|---|

| JOB STATUS | TRANSMISSION COMPLETE | F4 |
|---|---|---|

FIG. 6

| | | F5 |
|---|---|---|
| JOB ID | 00250 | |
| JOB TYPE | TRANSLATION OF SCANNED DOCUMENT | |
| NUMBER OF SHEETS | 26 | |
| USER ID | A | |
| PASSWORD | ABCD1234 | |
| DATE AND TIME OF DELEGATION | 2021/08/18 09:28:56 | |
| ESTIMATED TIME OF COMPLETION OF TRANSLATION | 30 MINUTES | |
| JOB STATUS | WAITING FOR TRANSLATION | |

| | | F6 |
|---|---|---|
| ESTIMATED TIME OF COMPLETION OF TRANSLATION | 12 MINUTES | |
| JOB STATUS | TRANSLATING | |

| | | F7 |
|---|---|---|
| ESTIMATED TIME OF COMPLETION OF TRANSLATION | 0 MINUTES | |
| JOB STATUS | TRANSLATION COMPLETE | |

JOB-CHECK SCREEN

USER A

CLOSE

00250   TRANSLATION OF SCANNED DOCUMENT

COUNTERPART: SERVICE FOR TRANSLATION OF
          SCANNED DOCUMENT

STATUS: TRANSLATING
NUMBER OF SHEETS/TRANSLATION REQUESTED: 26
NUMBER OF SHEETS/TRANSLATION COMPLETE: 10

UPDATE STATUS

ABORT

FIG. 9

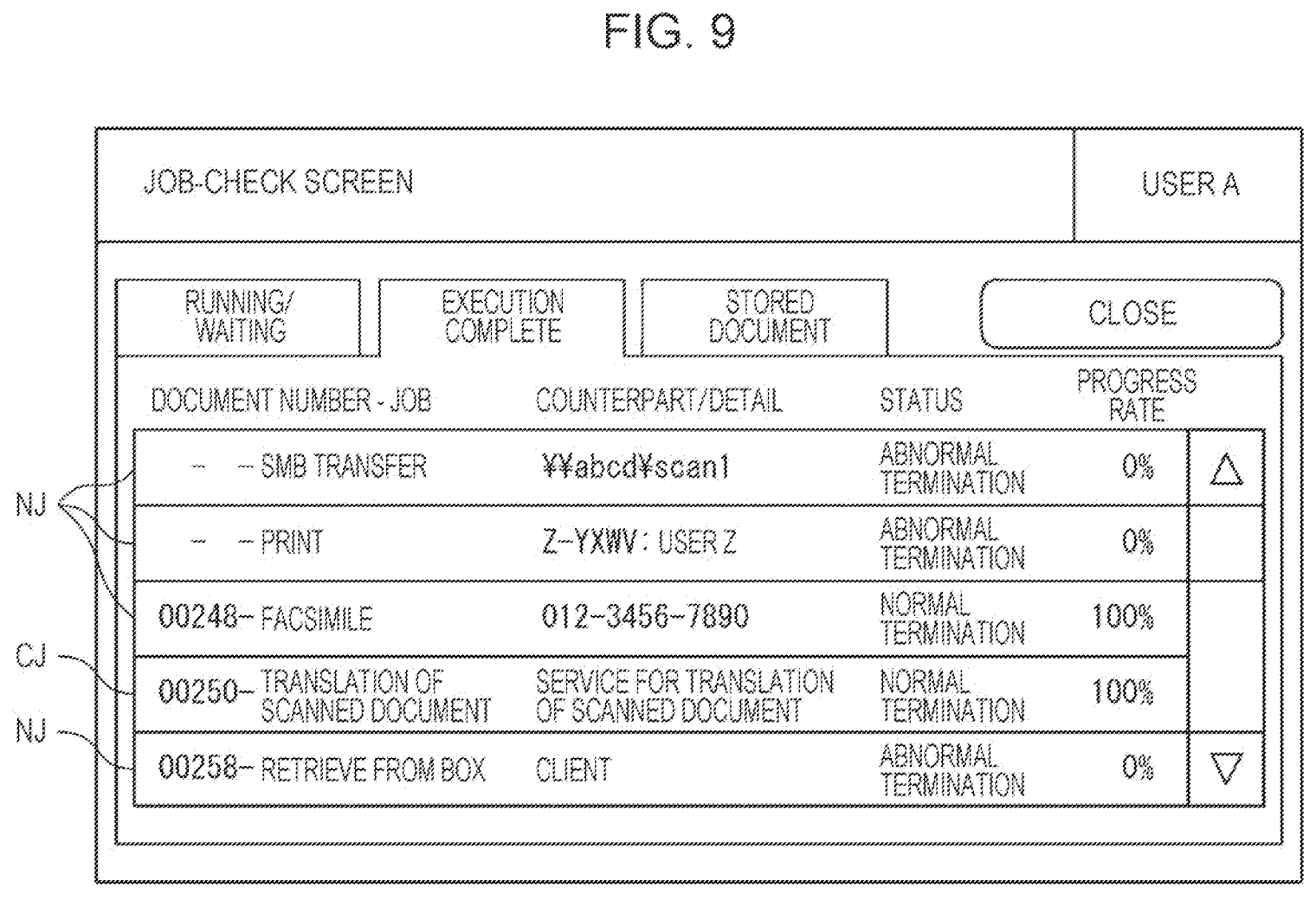

JOB-CHECK SCREEN

USER A

| RUNNING/WAITING | EXECUTION COMPLETE | STORED DOCUMENT | | CLOSE |
| --- | --- | --- | --- | --- |

| DOCUMENT NUMBER · JOB | COUNTERPART/DETAIL | STATUS | PROGRESS RATE |
| --- | --- | --- | --- |
| – – SMB TRANSFER | ¥¥abcd¥scan1 | ABNORMAL TERMINATION | 0% |
| – – PRINT | Z–YXWV : USER Z | ABNORMAL TERMINATION | 0% |
| 00248– FACSIMILE | 012–3456–7890 | NORMAL TERMINATION | 100% |
| 00250– TRANSLATION OF SCANNED DOCUMENT | SERVICE FOR TRANSLATION OF SCANNED DOCUMENT | NORMAL TERMINATION | 100% |
| 00258– RETRIEVE FROM BOX | CLIENT | ABNORMAL TERMINATION | 0% |

N1

CJ

N1

IMAGE FORMING APPARATUS, NON-TRANSITORY COMPUTER READABLE MEDIUM, AND IMAGE FORMING METHOD

CROSS-REFERENCE TO RELATED APPLICATIONS

This application is based on and claims priority under 35 USC 119 from Japanese Patent Application No. 2022-050179 filed Mar. 25, 2022.

BACKGROUND

(i) Technical Field

The present disclosure relates to an image forming apparatus, a non-transitory computer readable medium, and an image forming method.

(ii) Related Art

Japanese Unexamined Patent Application Publication No. 2017-111799 describes execution of a job through cooperation between a multifunction peripheral and a cloud service. The progress of the job is managed by the cloud service, and the progress of the job can be checked by accessing the cloud service.

SUMMARY

An image forming apparatus sometimes delegates a process to an external apparatus such as an apparatus in a cloud service. In such a case, since the process delegated to the external apparatus is not performed by the image forming apparatus, the process is not presented in a listing screen for information with regard to process history of the image forming apparatus. Consequently, the image forming apparatus is not able to notify a user of the progress of the process delegated to the external apparatus by the image forming apparatus.

Aspects of non-limiting embodiments of the present disclosure relate to providing an image forming apparatus, a non-transitory computer readable medium, and an image forming method that are able to notify a user of the progress of a process delegated to an external apparatus by the image forming apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including a processor configured to: in a case where the image forming apparatus delegates a process to an external apparatus, acquire from the external apparatus to which the process is delegated, first information with regard to progress of the process delegated to the external apparatus; and present the acquired first information in a listing screen for information with regard to executed-process history.

BRIEF DESCRIPTION OF THE DRAWINGS

An exemplary embodiment of the present disclosure will be described in detail based on the following figures, wherein:

FIG. 4 is an illustration depicting an example of an information management table managed by a cloud service server;

FIG. 6 is an illustration that depicts an example of an information management table managed by the image forming apparatus during a coordination process and that depicts process stages in the cloud service server;

FIG. 9 is an illustration that depicts an example presentation of a display state of a listing screen in the job-check screen, presenting jobs that are complete;

DETAILED DESCRIPTION

Figure 1:
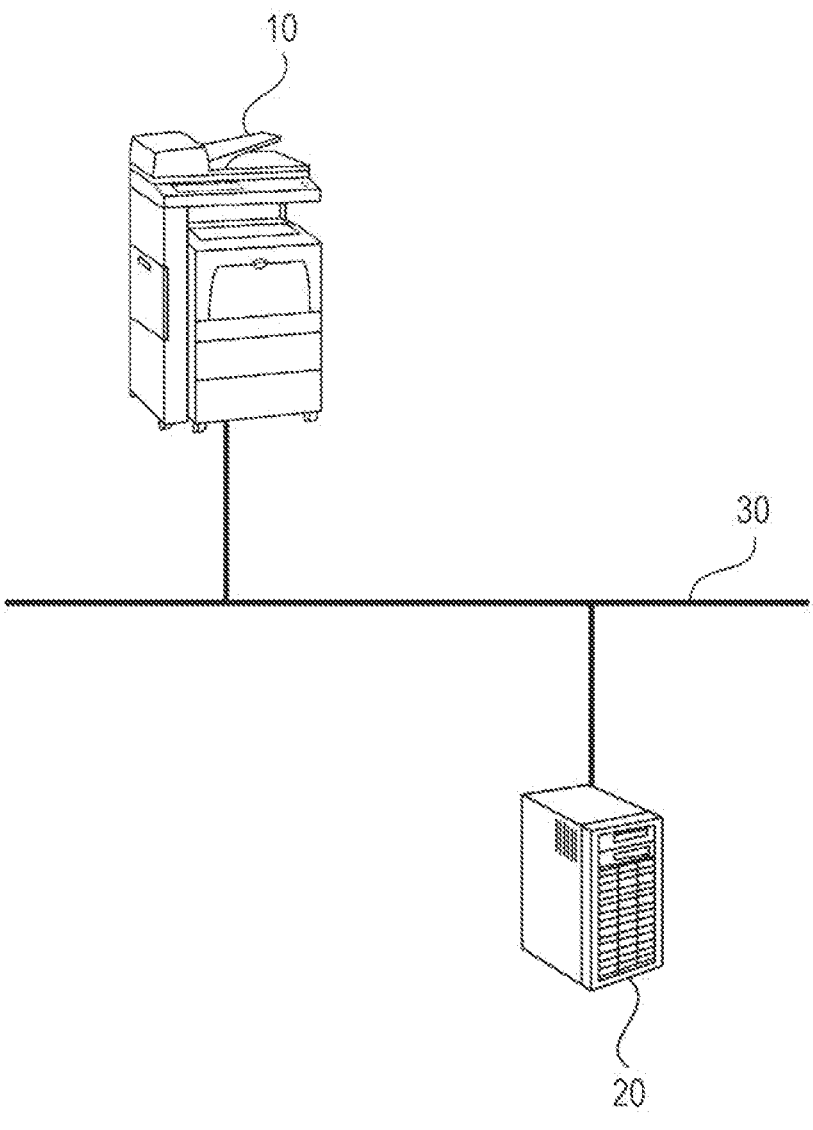
FIG. 1 is an illustration depicting a system configuration of a data processing system according to the exemplary embodiment of the present disclosure.

Next, an exemplary embodiment of the present disclosure will be described in detail with reference to the drawings. FIG. 1 is an illustration depicting a system configuration of a data processing system according to the exemplary embodiment of the present disclosure.

As depicted in FIG. 1, the data processing system according to the exemplary embodiment of the present disclosure includes an image forming apparatus 10 and a cloud service server 20, which are connected to each other by using a network 30. In this data processing system, the image forming apparatus 10 and the cloud service server 20 can cooperate to perform a coordination process including a series of procedures.

The image forming apparatus 10 has multiple functions such as a print function, a scan function, a copying function, and a facsimile function and is a so-called multifunction peripheral.

The cloud service server 20 is, for example, a server configured to provide a translation service. In more detail, when a process is delegated to the cloud service server 20 by the image forming apparatus 10, the cloud service server 20 performs an optical character reading (OCR) process on image data received from the image forming apparatus 10 and performs a translation process on characters contained in the image data. Then, the cloud service server 20 transmits a result of the translation obtained by the above process to the image forming apparatus 10. The cloud service server 20 is an example of an external apparatus in the technology of the present disclosure.

Figure 2:
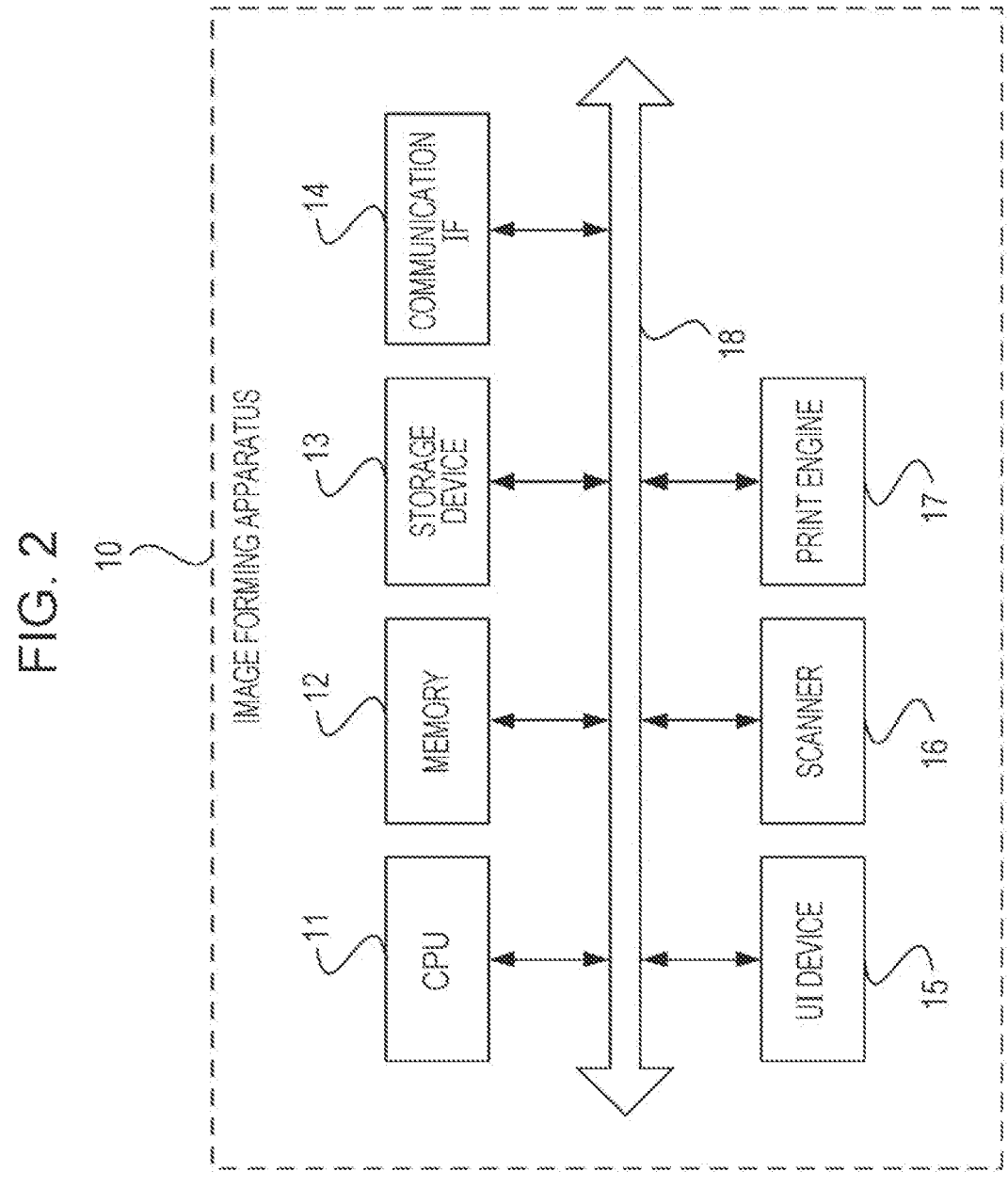
FIG. 2 is a block diagram depicting a hardware configuration of an image forming apparatus according to the exemplary embodiment of the present disclosure.

Next, FIG. 2 depicts a hardware configuration of the image forming apparatus 10 in the data processing system according to the present exemplary embodiment.

As depicted in FIG. 2, the image forming apparatus 10 includes a central processing unit (CPU) 11, a memory 12, a storage device 13 such as a hard disk drive, a communication interface (abbreviated to IF) 14, a user interface (abbreviated to UI) device 15 including a keyboard and a touch panel or a liquid crystal display, a scanner 16, and a print engine 17. These components are connected to each other by using a control bus 18.

The communication IF 14 is configured to transmit and receive data to and from, for example, an external apparatus via the network 30. The UI device 15 is configured to receive an instruction entry from a user. The scanner 16 is configured to read as image data a document placed on the image forming apparatus 10. The print engine 17 is configured to print an image on a recording medium such as a sheet of printing paper after performing processes such as charging, exposure, development, transfer, and fixing.

The CPU 11 is a processor that is configured to perform predetermined processing in accordance with a control program stored in the memory 12 or in the storage device 13 and that is configured to control operation of the image forming apparatus 10. Although the description in the present exemplary embodiment will be given on the assumption that the CPU 11 is configured to read and execute the control program stored in the memory 12 or in the storage device 13, the description will be given by way of illustration and not by way of limitation. The control program may be recorded in a computer-readable recording medium and provided. For example, the program may be stored in an optical disc, such as a compact disc read-only memory (CD-ROM) and a digital versatile disc read-only memory (DVD-ROM), or a semiconductor memory, such as a universal serial bus (USB) memory and a memory card, and such a recording medium may be provided. Further, the control program may be acquired from an external apparatus via a communication line connected to the communication interface 14.

Figure 3:
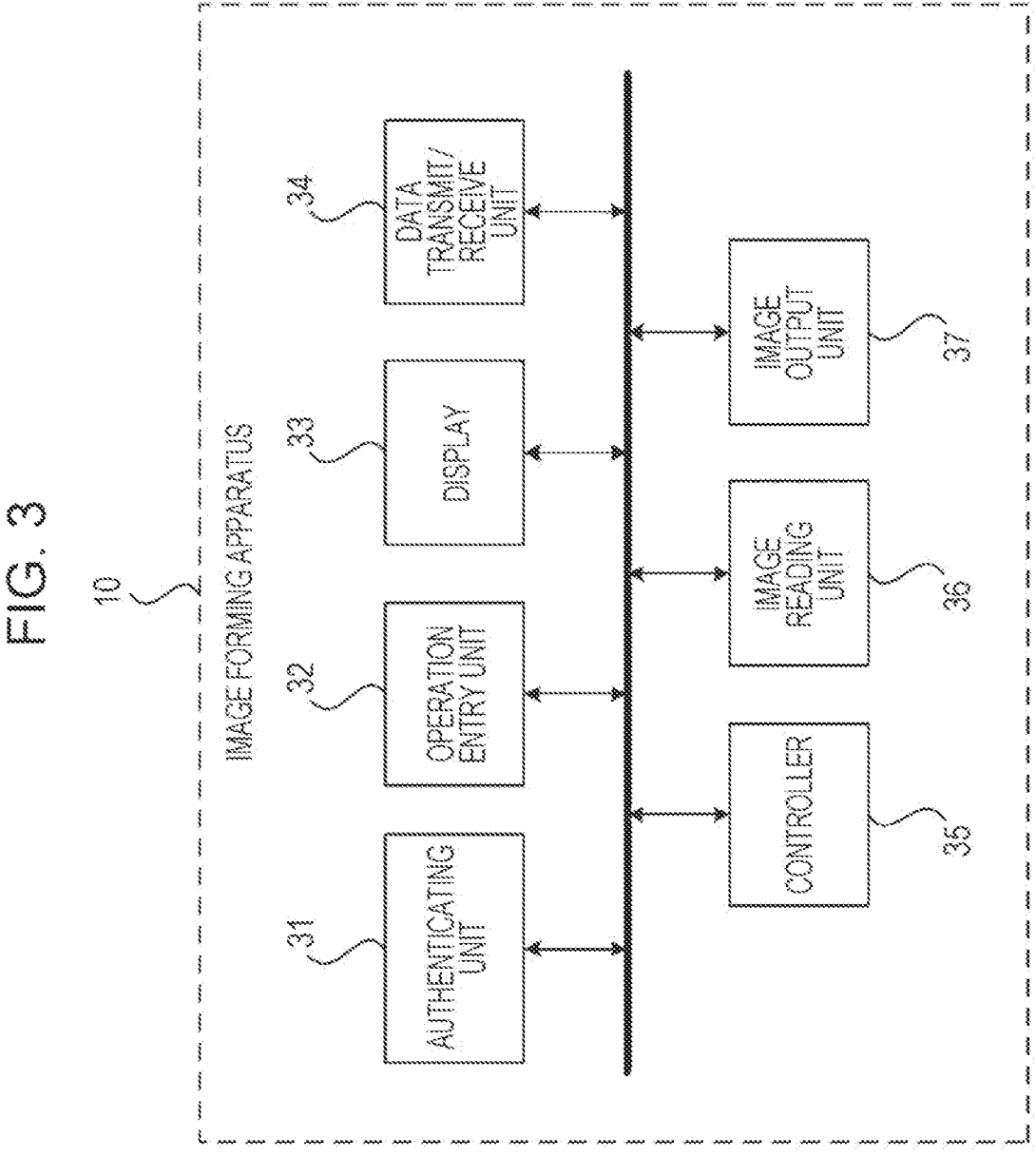
FIG. 3 is a block diagram depicting a functional configuration of the image forming apparatus according to the exemplary embodiment of the present disclosure.

FIG. 3 is a block diagram depicting a functional configuration of the image forming apparatus 10 implemented by the execution of the control program described above.

As depicted in FIG. 3, the image forming apparatus 10 according to the present exemplary embodiment includes an authenticating unit 31, an operation entry unit 32, a display 33, a data transmit/receive unit 34, a controller 35, an image reading unit 36, and an image output unit 37.

The authenticating unit 31 is configured to perform an authentication process for a user who is going to use the image forming apparatus 10. The operation entry unit 32 is configured to receive information regarding various operations performed by the user. The display 33 is controlled by the controller 35 and is configured to present various kinds of information to the user. The data transmit/receive unit 34 is configured to transmit and receive data to and from an external apparatus such as the cloud service server 20.

The controller 35 is configured to control overall operation of the image forming apparatus 10. The controller 35 is configured to perform such control as causing the image reading unit 36 to read a document image and causing the image output unit 37 to output print data in accordance with an instruction entry from the user.

The image reading unit 36 is configured to read a document image from a placed document in accordance with control by the controller 35. The image output unit 37 is configured to output an image on a recording medium such as a sheet of printing paper in accordance with control by the controller 35.

In a data processing system, a process delegated by an image forming apparatus to an external apparatus, such as an apparatus in a cloud service, is not usually presented in a listing screen for information with regard to process history of the image forming apparatus since the process delegated to the external apparatus is not performed by the image forming apparatus. Consequently, the image forming apparatus is not able to notify a user of the progress of the process delegated to the external apparatus by the image forming apparatus.

The image forming apparatus 10 according to the present exemplary embodiment is designed to address such a problem and is able to notify a user of the progress of a process delegated to an external apparatus by the image forming apparatus 10.

To perform such operation, in a case where the image forming apparatus 10 delegates a process to the cloud service server 20, the controller 35 acquires from the cloud service server 20, to which the process is delegated, first information with regard to the progress of the process delegated to the cloud service server 20, and the controller 35 presents the acquired first information in a listing screen for information with regard to executed-process history.

Further, in the present exemplary embodiment, in a case where a coordination process for coordinating a process performed by the image forming apparatus 10 with a process delegated to the cloud service server 20 by the image forming apparatus 10 is performed, the controller 35 acquires second information with regard to the progress of the process performed by the image forming apparatus 10, acquires the first information from the cloud service server 20, to which the process is delegated, and presents the acquired first information and the acquired second information in association with each other.

Further, the controller 35 presents the first information, which concerns the progress of the process delegated to the cloud service server 20, and the second information, which concerns the progress of the process performed by the image forming apparatus 10, together in a single display frame in the listing screen for information with regard to executed-process history.

Further, the controller 35 stores information with regard to coordination-process history and connection information in association with each other, the connection information being used to establish connection to the cloud service server 20, to which the process is delegated.

Further, the controller 35 acquires as the first information, from the cloud service server 20, to which the process is delegated, an estimated time of completion of the process delegated to the cloud service server 20.

Further, in response to an instruction from a user for updating presentation of the first information, the controller 35 acquires the first information again from the cloud service server 20, to which the process is delegated, and presents the acquired latest first information.

Description will be given in detail below with regard to a process performed by the data processing system according to the present exemplary embodiment. Description will be given herein with regard to translation of scanned document performed as a coordination process. In translation of scanned document, the image forming apparatus 10 first scans a document prepared by a user. Next, the image forming apparatus 10 delegates to the cloud service server 20 a process of translating characters included in the image data of the scanned document. Then, after the completion of the translation process delegated to the cloud service server 20, the image forming apparatus 10 acquires data of the result of the translation from the cloud service server 20 and prints the data of the result of the translation in accordance with an instruction from the user.

FIG. 4 is an illustration depicting an example of an information management table for translation processes managed by the cloud service server 20.

Figure 5:
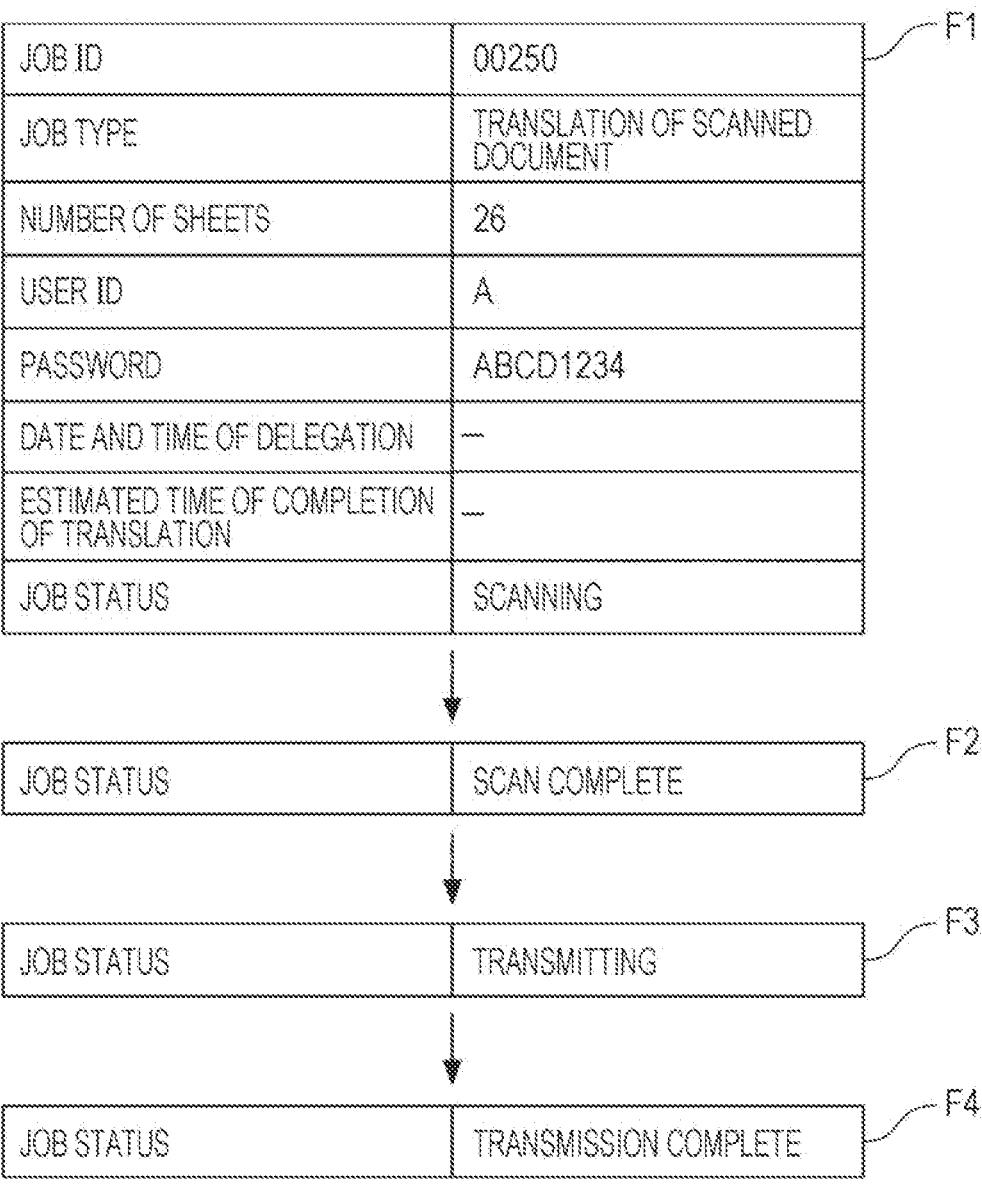
FIG. 5 is an illustration that depicts an example of an information management table managed by the image forming apparatus during a coordination process and that depicts process stages in the image forming apparatus.

FIG. 5 is an illustration that depicts an example of an information management table managed by the image forming apparatus 10 during a coordination process and that depicts process stages in the image forming apparatus 10. In FIG. 5, all the items are presented only in stage F1, and the same items as in stage F1 are not depicted in stages F2 to F4.

FIG. 6 is an illustration that depicts an example of an information management table managed by the image forming apparatus 10 during a coordination process and that depicts process stages in the cloud service server 20. In FIG. 6, all the items are presented only in stage F5, and the same items as in stage F5 are not depicted in stages F6 and F7.

First, description will be given with regard to the cloud service server 20. The cloud service server 20 is configured to accept delegation of a translation process from an outside apparatus such as the image forming apparatus 10. When a user delegates a translation process to the cloud service server 20 by using an outside apparatus, the user needs to log in to the cloud service server 20 from the outside apparatus by using a "user ID" and a "password".

As depicted in FIG. 4, the cloud service server 20 manages translation processes delegated by multiple apparatuses by using the information management table for translation processes. In the information management table for translation processes, pieces of information regarding items such as "document name", "languages", "date and time of delegation", and "status" are managed.

The item "document name" provides information regarding a unique ID for identifying data for which a translation process has been delegated. The item "languages" provides information regarding a language from which and a language to which the data for which a translation process has been delegated is translated. The item "date and time of delegation" provides information regarding a date and time when the translation process has been delegated to the cloud service server 20 by the outside apparatus. The item "status" provides information regarding the progress of the current translation process. Information such as "waiting for translation", which indicates that the document is waiting for a translation process, "translating", which indicates that the translation process is in progress, and "translation complete", which indicates that the translation process is complete, is entered into the item "status".

When a translation process is delegated to the cloud service server 20 by an outside apparatus, the cloud service server 20 notifies the outside apparatus of an estimated time of completion of translation based on the processing situation in the cloud service server 20 at the time of delegation. In addition to the time of delegation, in response to an inquiry from the outside apparatus, the cloud service server 20 notifies the outside apparatus of an estimated time of completion of translation at the time of inquiry. Further, when a delegated translation process is complete, the cloud service server 20 notifies the outside apparatus, which has delegated the translation process, of the completion of the translation.

Next, the image forming apparatus 10 will be described. In response to an instruction entry into the image forming apparatus 10 from a user for translation of scanned document, the controller 35 scans a document prepared by the user and creates an information management table for a job as depicted in FIG. 5.

In the information management table for a job, pieces of information regarding items such as "job ID", "job type", "number of sheets", "user ID", "password", "date and time of delegation", "estimated time of completion of translation", and "job status" are managed.

The item "job ID" provides information regarding a unique ID for identifying a job. The item "job type" provides information regarding the type of the job. The item "number of sheets" provides information regarding the number of sheets of a document processed in the job.

The item "user ID" provides information regarding a user ID necessary to log in to the cloud service server 20. The item "password" provides information regarding a password necessary to log in to the cloud service server 20. When a user delegates a translation process to the cloud service server 20, the user needs to log in to the cloud service server 20. The items "user ID" and "password" provide information necessary to log in to the cloud service server 20. The user may be allowed to enter these pieces of information when the user makes an instruction entry for translation of scanned document. Alternatively, these pieces of information may be acquired in advance and stored in association with login information of the user for the image forming apparatus 10.

The item "date and time of delegation" provides information regarding a date and time when the translation process is delegated to the cloud service server 20 by the image forming apparatus 10. The term "estimated time of completion of translation" provides information regarding an estimated time required to complete the translation process delegated to the cloud service server 20, and this information is acquired from the cloud service server 20 when the translation process is delegated to the cloud service server 20. Information regarding the items "date and time of delegation" and "estimated time of completion of translation" is not present at the start of the translation of scanned document and is entered when the translation process is delegated to the cloud service server 20.

The item "job status" provides information regarding the progress of the current job. As depicted in FIG. 5, information representing "scanning" is entered into the item "job status" at stage F1 when a document is being scanned after the start of the translation of scanned document. Information representing "scan complete" is entered into the item "job status" at stage F2 when scanning the document is complete. Information representing "transmitting" is entered into the item "job status" at stage F3 when the image data of the document is being transmitted to the cloud service server 20. Information representing "transmission complete" is entered into the item "job status" at stage F4 when the transmission of the image data is complete.

As depicted in FIG. 6, at stage F5 when the transmission of the image data is complete and a translation process has been delegated to the cloud service server 20, information representing "date and time of delegation" is entered into the information management table for a job. In addition, at stage F5, information representing "estimated time of completion of translation", which is acquired from the cloud service server 20, is entered into the information management table for a job.

Information representing "waiting for translation" is entered into the item "job status" at stage F5 when the translation process has been delegated to the cloud service server 20 and before the cloud service server 20 starts the translation process. Information representing "translating" is entered into the item "job status" at stage F6 when the cloud service server 20 is performing the translation process. Information representing "translation complete" is entered into the item "job status" at stage F7 when the cloud service server 20 has completed the translation process.

Figure 7:
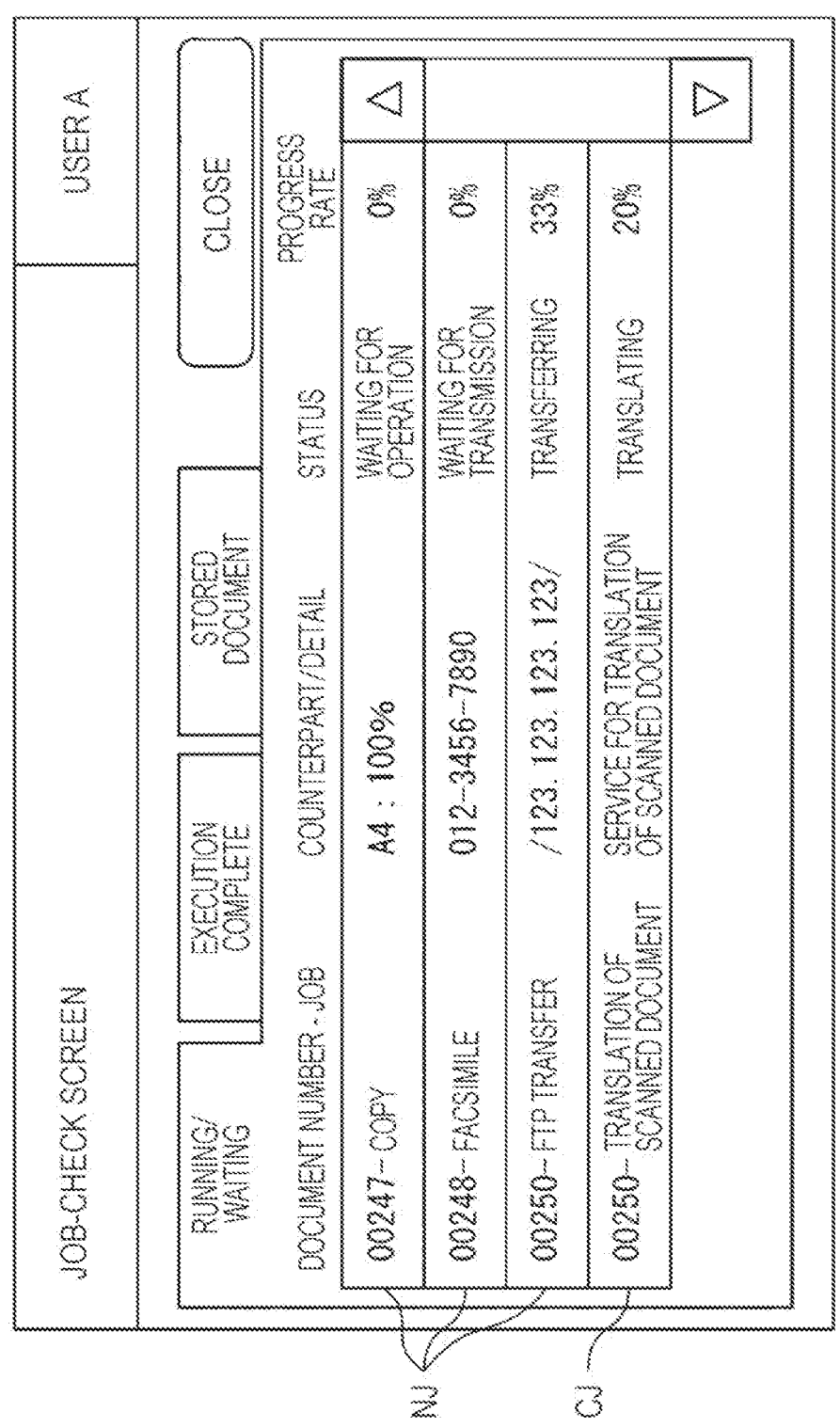
FIG. 7 is an illustration that depicts an example presentation of a display state of a listing screen in a job-check screen, presenting jobs that are running and jobs that are waiting.
Figure 8:
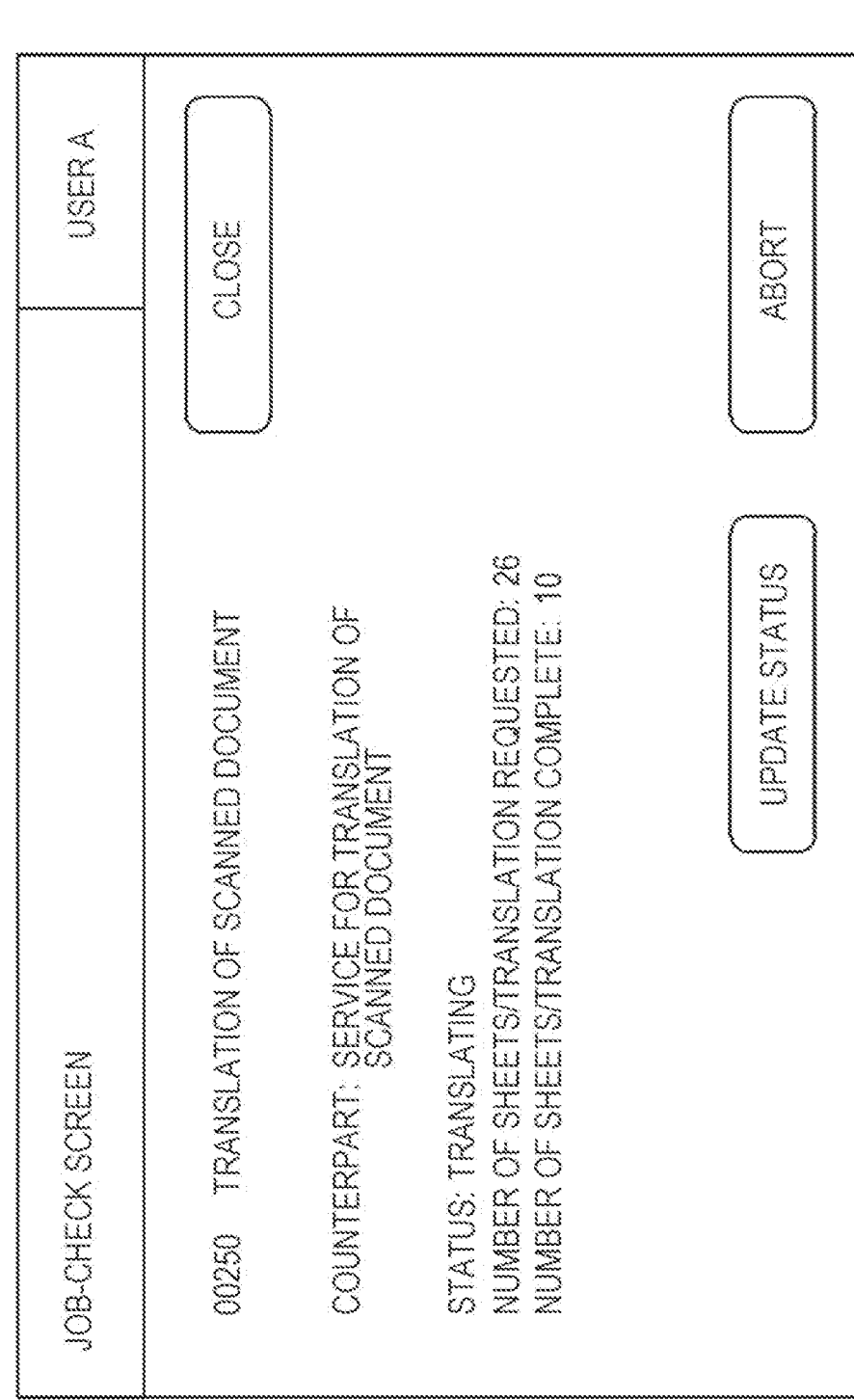
FIG. 8 is an illustration that depicts an example presentation of a display state of a detail-presentation screen in the job-check screen, presenting a job that is running or a job that is waiting.
Figure 10:
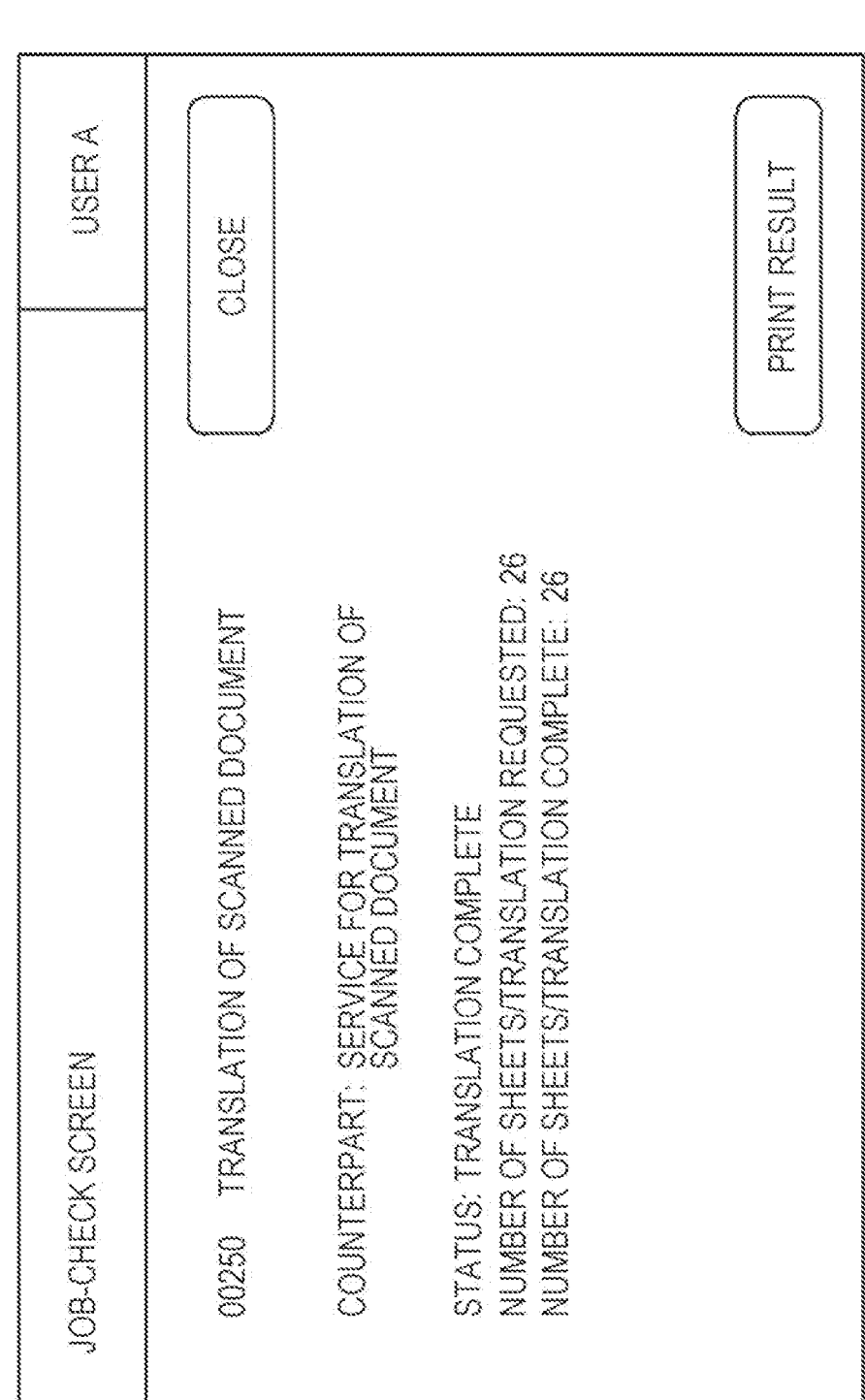
FIG. 10 is an illustration that depicts an example presentation of a display state of a detail-presentation screen in the job-check screen, presenting a job that is complete.

Next, description will be given with regard to the presentation of the progress of a job in the image forming apparatus 10. FIG. 7 is an illustration that depicts an example presentation of a display state of a listing screen in a job-check screen, presenting jobs that are running and jobs that are waiting. FIG. 8 is an illustration that depicts an example presentation of a display state of a detail-presentation screen in the job-check screen, presenting a job that is running or a job that is waiting. FIG. 9 is an illustration that depicts an example presentation of a display state of a listing screen in the job-check screen, presenting jobs that are complete. FIG. 10 is an illustration that depicts an example presentation of a display state of a detail-presentation screen in the job-check screen, presenting a job that is complete.

As described above, the job status at a process stage in the image forming apparatus 10 and the job status at a process stage in the cloud service server 20 are both managed based on the information management table for a job managed by the image forming apparatus 10. Thus, the image forming apparatus 10 is able to present information with regard to the progress of a process delegated to the cloud service server 20 in a listing screen for information with regard to job history. In the present exemplary embodiment, a listing screen in the job-check screen presented by the display 33 corresponds to the listing screen for information with regard to job history.

As depicted in FIG. 7, while a job of a coordination process is not complete, a job CJ of a coordination process is presented in the "running/waiting" tab of the listing screen along with normal jobs NJ that are processed only by the image forming apparatus 10. In the listing screen, pieces of information regarding items such as "document number", "job", "counterpart/detail", "status", and "progress rate" are presented for each job.

The item "document number" provides information regarding a unique number for identifying a job. This information is identical to the information regarding the item "job ID" in the information management table for a job. The item "job" provides information regarding the type of the job. This information is identical to the information regarding the item "job type" in the information management table for a job. The item "counterpart/detail" provides information regarding the counterpart to which connection is established when the job is executed or information regarding process details of the job. The information in the "counterpart/detail" may be included and managed in the information management table for a job or acquired from the information with regard to process history in the image forming apparatus 10 when the listing screen is presented. The item "status" provides information representing the progress of the current job. This information is identical to the information regarding the item "job status" in the information management table for a job. The item "progress rate" provides information representing an overall progress rate of the current job. The information regarding "progress rate" is calculated by the controller 35 when the listing screen is presented.

As depicted in FIG. 8, in response to the selection of a job by the user in the listing screen, the controller 35 switches the presentation from the listing screen to a detail-presentation screen for a selected job. In the detail-presentation screen, the progress of a current running process is presented in addition to the items "document number", "job", and "counterpart/detail". The progress of a current running process indicates individual progress of each process in an entire job, that is, individual progress of a process represented by the information in the item "job status" in the information management table for a job.

If the current running process is a process performed in the image forming apparatus 10, the controller 35 presents the progress of the current running process based on the situation of the process performed in the image forming apparatus 10. If the current running process is a process delegated to the cloud service server 20, the controller 35 requests the progress of the current process from the cloud service server 20 when presenting the detail-presentation screen and presents the progress based on the notification from the cloud service server 20.

For example, as depicted in FIG. 8, if the item "job status" indicates translating, the progress of the current running process is presented in a manner that makes individual progress of the current process recognizable, such as "status: translating", "number of sheets/translation requested: 26", and "number of sheets/translation complete: 10".

Buttons named "UPDATE STATUS", "ABORT", and "CLOSE" are disposed in the detail-presentation screen. In response to the entry of the "UPDATE STATUS" button by the user, the controller 35 requests the progress of the current process from the cloud service server 20 and updates the presentation of the progress based on the notification from the cloud service server 20. In response to the entry of the "ABORT" button by the user, the controller 35 notifies the cloud service server 20 of aborting the current process and aborts the current job entirely. In response to the entry of the "CLOSE" button by the user, the controller 35 closes the detail-presentation screen and switches the presentation to the listing screen.

As depicted in FIG. 9, when the job of a coordination process is complete, the job CJ of a coordination process is presented in the "execution complete" tab of the listing screen along with the normal jobs NJ that are processed only by the image forming apparatus 10.

As depicted in FIG. 10, in response to the selection of a job by the user in the listing screen, the controller 35 switches the presentation from the listing screen to a detail-presentation screen for a selected job. After the job of a coordination process is complete, the buttons named "PRINT RESULT" and "CLOSE" are disposed in the detail-presentation screen. In response to the entry of the "PRINT RESULT" button by the user, the controller 35 acquires the result of the translation from the cloud service server 20 and instructs the image output unit 37 to print the result of the translation. With such a button disposed, the user is able to directly print the result of the translation by using the image forming apparatus 10 without accessing the cloud service server 20 separately. In response to the entry of the "CLOSE" button by the user, the controller 35 closes the detail-presentation screen and switches the presentation to the listing screen.

The image forming apparatus 10 has an upper limit to the number of pieces of information that can be retained with regard to execution-completed jobs, and when the number of pieces of information exceeds a predetermined number for retention, the oldest piece of information is usually deleted. However, the image forming apparatus 10 need not delete a job of a coordination process and may retain the job until the retention period of the information in the cloud service server 20 expires.

By adopting the operation mode as described above, the user can be notified of the progress of a process delegated to the cloud service server 20 by the image forming apparatus 10.

In general, if an image forming apparatus has an uncompleted job, the image forming apparatus cannot be powered off. In contrast, the image forming apparatus 10 according to the present exemplary embodiment manages the job status separately in a process in the image forming apparatus 10 and in a process in the cloud service server 20. Accordingly, after a process in the image forming apparatus 10 is complete, the image forming apparatus 10 can be powered off if a job of a coordination process is not complete.

However, since a process situation in the cloud service server 20 cannot be incorporated into the information management table for a job while the image forming apparatus 10 is powered off, the information in the information management table may become inaccurate. A similar situation also occurs when the image forming apparatus 10 enters a waiting state in which one or more functions are restricted. Thus, in the present exemplary embodiment, the controller 35 may again acquire the information with regard to the progress of a process delegated to the cloud service server 20 from the cloud service server 20, to which the process is delegated, at at least one of the following time points: after the image forming apparatus 10 returns to a normal state after entering the waiting state after a coordination process is performed and after the image forming apparatus 10 is powered on after being powered off after a coordination process is performed.

In accordance with an estimated time of completion acquired for the first time after a process is delegated to the cloud service server 20, the controller 35 may periodically acquire from the cloud service server 20, to which the process is delegated, the information with regard to the progress of the process delegated to the cloud service server 20. The time intervals between periodical acquisitions of information with regard to the progress may be determined, for example, by dividing the estimated time of completion, which is acquired for the first time, by a predetermined number of acquisitions.

When the information with regard to the progress is periodically acquired as described above, the controller 35 may present the latest estimated time of completion as the information with regard to the progress of the process delegated to the cloud service server 20.

Further, while a process delegated to the cloud service server 20 is in progress, the controller 35 may acquire a result of a completed portion of the process from the cloud service server 20, to which the process is delegated.

Figure 11:
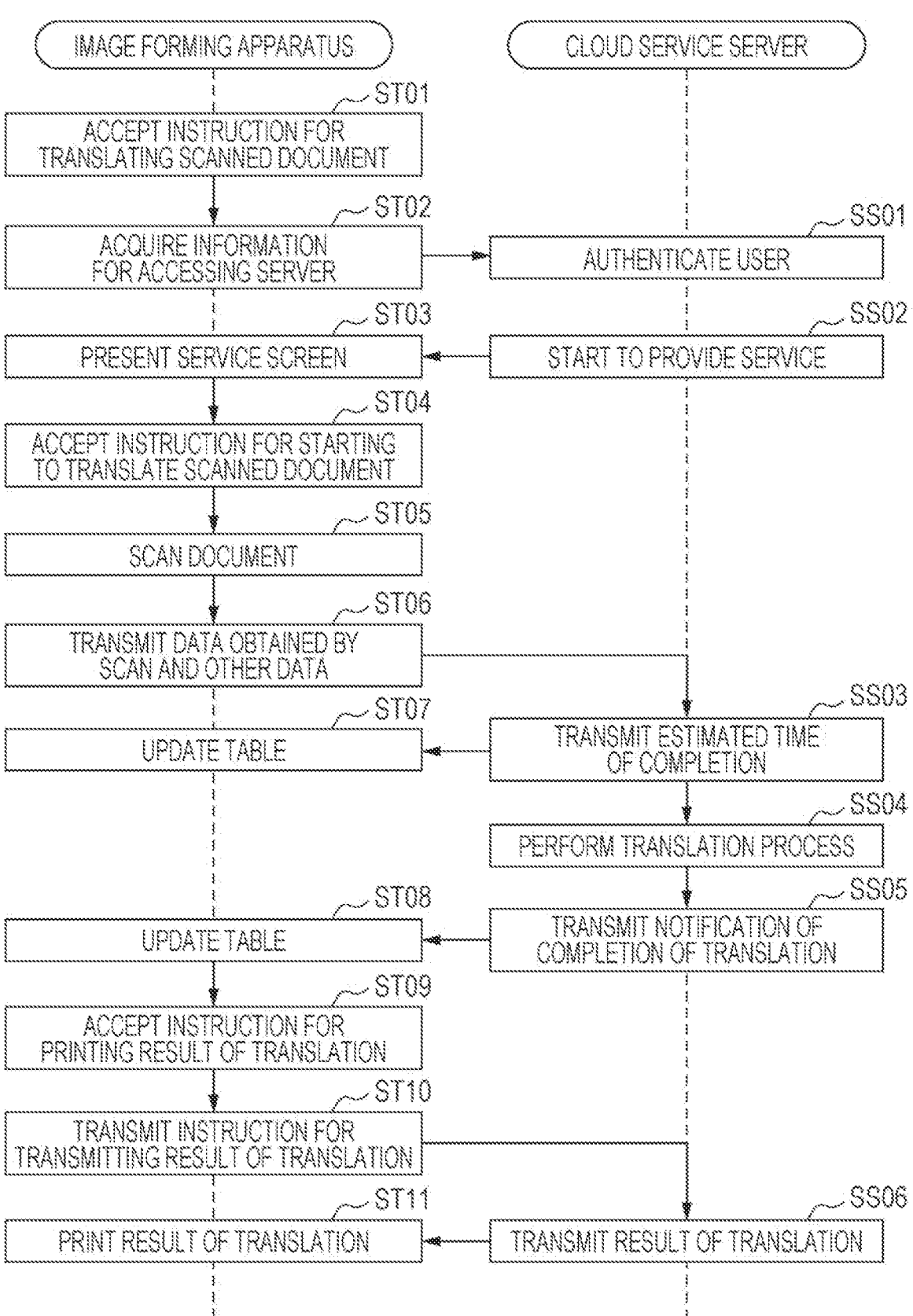
FIG. 11 is a flowchart for illustrating a process in the data processing system.

Next, description will be given with regard to a process in the data processing system according to the present exemplary embodiment with reference to the flowchart in FIG. 11. In the following description, it is assumed that processes in the image forming apparatus 10 is performed by the controller 35.

Upon accepting an instruction for translating a scanned document from a user in step ST01, the image forming apparatus 10 acquires information for accessing the cloud service server 20 and transmits the information to the cloud service server 20 in step ST02. Specifically, the information for accessing the cloud service server 20 includes a user ID and a password.

Upon receiving the user ID and the password from the image forming apparatus 10, the cloud service server 20 authenticates the user in step SS01. If the user is successfully authenticated, then, the cloud service server 20 starts to provide a translation service and transmits information necessary for presenting a service screen to the image forming apparatus 10 in step SS02.

Upon receiving the information necessary for presenting the service screen from the cloud service server 20, the image forming apparatus 10 presents a translation-service screen and allows the user to enter information necessary for the service in step ST03. Examples of the information necessary for the service include a source language, a target language, and a dictionary to be used.

Next, upon accepting an instruction for starting to translate a scanned document from the user in step ST04, the image forming apparatus 10 scans a document placed by the user in step ST05. In response to the completion of the scan, the image forming apparatus 10 transmits data obtained by the scan and the information necessary for the service to the cloud service server 20 in step ST06.

Upon receiving the data obtained by the scan and the information necessary for the service from the image forming apparatus 10, the cloud service server 20 transmits an estimated time of completion of translation to the image forming apparatus 10 in step SS03 and performs a translation process in step SS04.

Upon receiving the estimated time of completion of translation from the cloud service server 20, the image forming apparatus 10 updates the information management table for a job in step ST07. The image forming apparatus 10 is able to update the information management table for a job by proactively requesting the estimated time of completion of translation from the cloud service server 20 periodically or in response to an instruction entry from the user before notification of completion of translation is received from the cloud service server 20.

When the translation process is complete, the cloud service server 20 transmits the notification of completion of translation to the image forming apparatus 10 in step SS05.

Upon receiving the notification of completion of translation from the cloud service server 20, the image forming apparatus 10 updates the information management table for a job in step ST08. Thereafter, upon accepting an instruction for printing the result of the translation from the user in step ST09, the image forming apparatus 10 transmits to the cloud service server 20 an instruction for transmitting the result of the translation in step ST10.

Upon receiving the instruction for transmitting the result of the translation from the image forming apparatus 10, the cloud service server 20 transmits the result of the translation to the image forming apparatus 10 in step SS06.

Upon receiving the result of the translation from the cloud service server 20, the image forming apparatus 10 prints the result of the translation in step ST11 and finishes the process.

Modification

The description has been given with regard to the data processing system according to an exemplary embodiment of the present disclosure, and the technology according to the present disclosure is not limited to the exemplary embodiment described above and may appropriately be modified.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
a processor configured to:
in a case where the image forming apparatus delegates a first process to an external apparatus to be performed by the external apparatus, acquire from the external apparatus, first information with regard to a progress of the first process delegated to the external apparatus;
present concurrently in a listing screen (i) a progress of a second process being performed by the image forming apparatus and (ii) the progress of the first process based on the acquired first information;
in a case where a coordination process for coordinating the second process performed by the image forming apparatus with the first process delegated to the external apparatus by the image forming apparatus is performed,
acquire second information with regard to a progress of the second process performed by the image forming apparatus; and
present the acquired first information and the acquired second information in association with each other;
store information with regard to coordination-process history and connection information in association with each other, the connection information being used to establish connection to the external apparatus to which the first process is delegated; and
acquire the first information again from the external apparatus to which the process is delegated, at one or more of the following time points:
after the image forming apparatus returns to a normal state after entering a waiting state after the coordination process is performed, the waiting state being a state in which one or more functions of the image forming apparatus are restricted; and
after the image forming apparatus is powered on after being powered off after the coordination process is performed.

2. The image forming apparatus according to claim 1, wherein the processor is configured to:
present the first information and the second information together in a single display frame in the listing screen.

3. The image forming apparatus according to claim 1, wherein the processor is configured to:
acquire as the first information, from the external apparatus to which the process is delegated, an estimated time of completion of the first process delegated to the external apparatus.

4. The image forming apparatus according to claim 2, wherein the processor is configured to:
acquire as the first information, from the external apparatus to which the process is delegated, an estimated time of completion of the first process delegated to the external apparatus.

5. The image forming apparatus according to claim 3, wherein the processor is configured to:
in accordance with the estimated time of completion acquired for a first time after the first process is delegated to the external apparatus, periodically acquire the first information from the external apparatus.

6. The image forming apparatus according to claim 5, wherein the processor is configured to:
present a latest estimated time of completion as the first information.

7. The image forming apparatus according to claim 1, wherein the processor is configured to:
in response to an instruction from a user for updating presentation of the first information, acquire the first information again from the external apparatus, and present the acquired latest first information.

8. The image forming apparatus according to claim 1, wherein the processor is configured to:
while the first process delegated to the external apparatus is in progress of being performed by the external apparatus, acquire a result of a completed portion of the first process from the external apparatus.

9. A non-transitory computer readable medium storing a program causing a computer in an image forming apparatus to execute a process, the process comprising:
in a case where the image forming apparatus delegates a first process to an external apparatus to be performed by the external apparatus, acquiring from the external apparatus, first information with regard to a progress of the first process delegated to the external apparatus;
presenting concurrently in a listing screen (i) a progress of a second process being performed by the image forming apparatus and (ii) the progress of the first process based on the acquired first information;
in a case where a coordination process for coordinating the second process performed by the image forming apparatus with the first process delegated to the external apparatus by the image forming apparatus is performed,
acquiring second information with regard to a progress of the second process performed by the image forming apparatus; and
presenting the acquired first information and the acquired second information in association with each other;
storing information with regard to coordination-process history and connection information in association with each other, the connection information being used to establish connection to the external apparatus to which the first process is delegated; and
acquiring the first information again from the external apparatus to which the process is delegated, at one or more of the following time points:

after the image forming apparatus returns to a normal state after entering a waiting state after the coordination process is performed, the waiting state being a state in which one or more functions of the image forming apparatus are restricted; and after the image forming apparatus is powered on after being powered off after the coordination process is performed.

10. An image forming method performed by using an image forming apparatus, the method comprising:

in a case where the image forming apparatus delegates a first process to an external apparatus to be performed by the external apparatus, acquiring from the external apparatus, first information with regard to a progress of the first process delegated to the external apparatus; and presenting concurrently in a listing screen (i) a progress of a second process being performed by the image forming apparatus and (ii) the progress of the first process based on the acquired first information;

in a case where a coordination process for coordinating the second process performed by the image forming apparatus with the first process delegated to the external apparatus by the image forming apparatus is performed, acquiring second information with regard to a progress of the second process performed by the image forming apparatus; and presenting the acquired first information and the acquired second information in association with each other;

storing information with regard to coordination-process history and connection information in association with each other, the connection information being used to establish connection to the external apparatus to which the first process is delegated; and acquiring the first information again from the external apparatus to which the process is delegated, at one or more of the following time points:

after the image forming apparatus returns to a normal state after entering a waiting state after the coordination process is performed, the waiting state being a state in which one or more functions of the image forming apparatus are restricted; and after the image forming apparatus is powered on after being powered off after the coordination process is performed.

* * * * *